United States Patent Office 3,816,553
Patented June 11, 1974

1

3,816,553
PERFLUOROMETHYLENECYCLOPROPANE
Bruce E. Smart, Wilmington, Del., assignor to E. I. du Pont de Nemours and Company, Wilmington, Del.
No Drawing. Filed Mar. 8, 1973, Ser. No. 339,422
Int. Cl. C07c 23/04
U.S. Cl. 260—648 F     1 Claim

ABSTRACT OF THE DISCLOSURE

Thermal reaction of excess hexafluoropropylene epoxide with 2,3-dichloro - 1,1,3,3 - tetrafluoropropene at 185–210° C. gives 1 - (chlorodifluoromethyl) - 1 - chloro-2,2,3,3 - tetrafluorocyclopropane which can be dechlorinated by zinc in the presence of a saturated aliphatic ether diluent at 70° C. to 140° C. to give perfluoromethylenecyclopropane. Perfluoromethylenecyclopropane can be homopolymerized or copolymerized with vinyl comonomers to useful polymers using free radical initiators. Polymerization occurs by opening of the cyclopropane ring so that the copolymer contains pendant difluoromethylene groups which provide crosslinking sites.

CAUTION

Perfluoromethylenecyclopropane is believed to be highly toxic.

BACKGROUND OF THE INVENTION

Field of the Invention

This invention relates to perfluoromethylenecyclopropane (PMCP), an intermediate for its preparation, and homopolymers and copolymers of PMCP with other vinyl monomers.

Relation to the Prior Art

Perfluorovinylcyclopropane and perfluoroallylcyclopropane have been reported (Mitsch, U.S. 3,509,197 (1970)). Copolymers of the former are disclosed, but they presumably have a normal structure in which the cyclopropane ring remains intact in the polymer. A homopolymer of tetrafluoroallene is known which has pendant difluoromethylene groups (Jacobs and Bauer, U.S. 3,148,223 (1964)). Copolymers of tetrafluoroallene with vinyl monomers, specifically tetrafluoroethylene, are disclosed.

Summary of the Invention

The present invention comprises the novel compound perfluoromethylenecyclopropane, the new compound 1-(chlorodifluoromethyl) - 1 - chloro-2,2,3,3-tetrafluorocyclopropane used as an intermediate in the preparation thereof, and polymers thereof containing from 0.1% to 100% by weight of perfluoromethylenecyclopropane and monomers which can be polymerized by free radical initiated chain propagation.

Detailed Description of the Invention

The present invention is based on the new monomer, perfluoromethylenecyclopropane.

The perfluoromethylenecyclopropane monomer undergoes ring-opening polymerization so that the polymer units, both in the homopolymer and copolymers with other monomers, contain pendant difluoromethylene groups, thus:

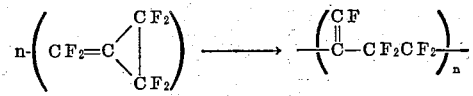

The presence of the pendant difluoromethylene groups in the polymer chains permits crosslinking in a conventional manner with little or no elimination of gaseous by-products.

2

A preferred process for making the perfluoromethylenecyclopropane of this invention comprises the two-step process shown in equation 1(a) and 1(b):

1(a) $CF_2=C(Cl)CF_2Cl + CF_3CFCF_2$ 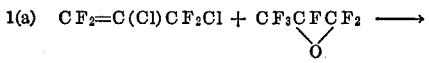 →

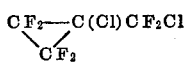

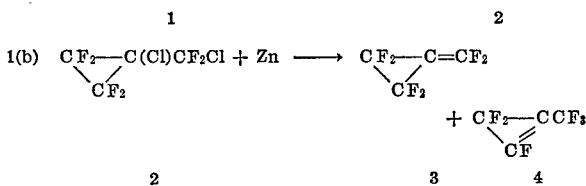

The novel intermediate 1 - (chlorodifluoromethyl)-1-chloro - 2,2,3,3 - tetrafluorocyclopropane is obtained by thermal reaction of hexafluoropropylene oxide with the known 2,3 - dichloro - 1,1,3,3 - tetrafluoropropene within a temperature range of 185–210° C. for a period of 8–12 hours. An excess of hexafluoropropylene oxide, preferably 1.5–2.5 molar equivalents per mole of olefin, is usually employed in order to achieve satisfactory conversion of the olefin. No added solvent is normally required for this reaction. The cyclopropane reaction product 2 can be separated from 1 by distillation, and unreacted 1 recycled in the reaction.

The novel intermediate 2 is subsequently converted by reaction 1(b) to the novel perfluoromethylenecyclopropane 3. A small amount of the isomeric product, 1-trifluoromethyl - 2,3,3 - trifluorocyclopropene, 4, is normally also formed in this reaction. The isomer 4 arises by isomerization of 3. Dechlorination is preferably effected with zinc metal or zinc/mercury amalgam. Various forms of zinc may be employed, i.e., zinc dust, granular zinc or zinc ribbon, although zinc dust is preferred. It is also preferred, although not necessary, to "activate" the zinc dust before use. Activation is usually carried out by successively washing the zinc dust with dilute hydrochloric acid, acetone, ethanol and ether followed by drying under nitrogen. The molar ratio of zinc to intermediate 2 is not critical but should be at least 1:1 to achieve complete conversion of 2. Excess zinc may be employed.

A solvent/diluent is normally required for the dehalogenation reaction, and suitable solvents include selected aliphatic ethers, principally di-n-alkyl ethers. Preferred solvents are dioxane and di-n-butyl ether with dioxane being especially preferred. Although it is not necessary, the reaction is preferably carried out at atmospheric pressure at or below the reflux temperature of the solvent. Adequate agitation is required since the zinc is not soluble in the reaction medium.

Although catalysts are not required, suitable catalysts may be employed in the dehalogenation reaction e.g., a zinc halide such as zinc chloride or zinc bromide. Such catalysts tend to increase the conversion rate of 2 to 3, but they also accelerate the isomerization of 3 to 4. If a suitably long contact time is employed, complete isomerization of 3 to 4 is realized in the presence of zinc bromide. (See Example 10.)

Reaction temperature is important to reaction rate, but product may be obtained over a temperature range of 70–140° C. However, it is preferred to carry out the reaction in the temperature range 80–100° C.

The reaction is normally conducted by addition of 2 to a well-stirred suspension of zinc in a solvent/diluent, either with or without a catalyst. For maximum yields, very slow addition rates should be avoided since these promote rearrangement of 3 to 4. The preferred procedure is rapid addition of 3 once dehalogenation has commenced (30–60 minutes). The reaction mixture should be protected from atmospheric moisture, and is preferably blanketed with an inert atmosphere, e.g., nitrogen.

The reaction product is usually separated by distillation, and it consists of a mixture of 3 and 4. The use of a rapid addition procedure and the absence of a catalyst leads to higher ratios of 3 to 4, frequently 9:1 to 20:1. Pure 3 can be obtained free of 4 by other separation techniques, for example, gas-liquid chromatography. However, it is not necessary to remove 4 to obtain satisfactory polymerization of 3. If purified 4 is desired, it can be readily obtained by catalytic isomerization of 3 (Example 10).

When copolymers are made, it is preferred to use from 0.1 to 90% by weight of the perfluoromethylenecyclopropane and most preferably from 0.5 to 20% by weight.

The novel homopolymer and copolymers of this invention can be prepared by standard polymerization techniques, either *neat* or in the presence of a non-reactive solvent for the monomers. Completely halogenated solvents are preferred with 1,1,2-trichloro-1,2,2-trifluoroethane (Freon® 113) being especially preferred.

Both homopolymerization and copolymerization of perfluoromethylenecyclopropane are initated with free radical initiators which do not contain hydrogen atoms. Suitable initiators include perfluoropropionyl peroxide (3P), $N_2F_2$, $CF_3OOCF_3$ with 3P being preferred. The initiator concentration is not critical since only catalytic quantities are required, and concentrations of 0.01–5% initiator based on total weight of monomers may be employed. It is preferred to use 0.1 to 1 weight percent of initiator.

Polymerization temperatures employed are dependent upon the particular initiator used, since each initiator has a preferred temperature range for optimum formation of free radicals. With 3P initiator, it is preferred to operate within the range of 10–50° C. with temperatures of 20–35° C. being especially preferred.

The purity of the perfluoromethylenecyclopropane monomer is not critical for preparation of polymers, and the monomer may contain up to about 30% of the isomeric compound, 1 - trifluoromethyl-2,3,3-trifluorocyclopropene (4), and still be suitable for polymerization. This isomer is inert to free radical polymerization under the conditions employed for successful polymerization of perfluoromethylenecyclopropane and it is recovered unchanged.

Comonomers used to prepare copolymers with perfluoromethylenecyclopropane may be comprised of fluorine-containing comonomers, or non-fluorine-containing comonomers. Comonomers suitable for use include those that undergo free radical-initiated polymerization or copolymerization, preferably through a single unsubstituted group. Preferred fluorine-containing comonomers include tetrafluoroethylene, hexafluoropropylene, vinyl fluoride, vinylidene fluoride, chlorotrifluoroethylene, perfluoro(2-methylene-4-methyl-1,3-dioxolane), and perfluoroalkyl-vinyl ethers, $CF_2=CFOR_f$, where $R_f$ is perfluoroalkyl of 1–3 carbon atoms. Preferred non-fluorine-containing comonomers are acrylonitrile, 2-methylacrylonitrile, styrene, α-methylstyrene, vinyl acetate, vinyl butyrate, methyl acrylate, methyl methacrylate, vinyl chloride, vinylidene chloride, ethylene, propylene, acrolein and methacrolein.

Other comonomers include 2-alkylacrylonitriles, including the 2-ethyl, 2-n-propyl, 2-neopentyl and 2-hexyl derivatives, 2 - trifluoromethylacrylonitrile, 2 - carbomethoxy-acrylonitrile, 2 - carboethoxy- and 2 - carbobutoxy-acrylonitrile, 2-phenylacrylonitrile, 2-fluoroacrylonitrile, trifluoroacrylonitrile, 2-acetoxyacrylonitrile, acrylic and methacrylic acids, alkyl esters of acrylic and methacrylic acid with up to 18 carbons in the alkyl group, including the ethyl, butyl, i-butyl, hexyl, n-dodecyl and octodecyl esters, maleic anhydride, o-, m- and p-methylstyrene, ethyl vinyl ether and the alkyl vinyl ethers, halosubstituted styrene, 2-vinylpyridine, N-vinylsuccinimide and other N-vinylimides, vinyl esters of saturated fatty acids ($C_2$–$C_{18}$ range), including vinyl caproate, vinyl laurate, and vinyl palmitate, vinyl benzoate, and N-methylolacrylamide.

The novel polymers of this invention are useful since they are readily crosslinked with little or no elimination of gaseous by-products by virtue of the pendant difluoromethylene groups attached to the polymer chain. It is unnecessary to pre-treat the polymers prior to vulcanization to provide crosslinking sites, since these sites are present in the pendant difluoromethylene groups. Such crosslinked polymers exhibit outstanding heat and corrosion resistance.

In addition, the homopolymer and copolymers of this invention are useful as oil and water repelling agents for glass and paper. For example, copolymers of perfluoromethylenecyclopropane with vinyl fluoride and with vinylidene fluoride dissolved in acetone can be cast in thin films on glass or paper substrates. Such substrates are rendered impervious to water by such treatment.

Embodiments of the Invention

The following examples illustrate specific embodiments of the invention.

EXAMPLE 1

1-(Chlorodifluoromethyl)-1-chloro-2,2,3,3-tetrafluorocyclopropane

Two glass Carius tubes were each charged with 18.3 g. (0.1 mole) of 2,3-dichlorotetrafluoropropene 1, 30 g. (0.18 mole) of hexafluoropropylene oxide (HFPO) and 0.5 g. of phenothiazine and were heated at 185° C. for 8 hours. The tube contents were transferred to a distillation pot and fractionated to afford 7.1 g. of recovered 1; 8.8 g. of a mixture of 80% 1-(chlorodifluoromethyl)-1-chloro-2,2,3,3-tetrafluorocyclopropane (2) and 20% 1, b.p. 48–50° C. (analyzed by NMR); 2.8 g. of a mixture of 90% 2 and 10% 1, b.p. 51–55° C.; and 18.7 g. of pure 2, b.p. 57° C.; NMR ($CCl_4$, $CFCl_3$ reference) φ 54.0 (t of t, 2, $J_{AX}$=21 Hz., $J_{BX}$=2.5 Hz.), 140.8, 149.8 (AA′BB′, m of m, 4, $J_{AB}$=182 Hz., A: further split into triplets (J=21 Hz.) of multiplets, B: further split into triplets (J=2.5 Hz.) of multiplets). The fraction, b.p. 57° C. was analyzed.

*Anal.*:—Calcd. for $C_4Cl_2F_6$: C, 20.62; Cl, 30.43; F, 48.92. Found: C, 20.30; Cl, 30.80; F, 49.05.

EXAMPLE 2

Eight glass Carius tubes were each charged with 15 g. of a mixture of 1-(chlorodifluoromethyl)-1-chlorotetrafluorocyclopropane (27%) and 2,3-dichlorotetrafluoropropene (73%), b.p. 43–56° C., and 30 g. of HFPO and the tubes were heated at 185° C. for 10 hours. The tubes were cooled, the contents combined and distilled to give 83.9 g. of pure 1-(chlorodifluoromethyl)-1-chlorotetrafluorocyclopropane, b.p. 57–58° C.

EXAMPLE 3

Perfluoromethylenecyclopropane

A flask fitted with a dropping funnel, water condenser, and a Dry Ice/acetone trap attached to the condenser outlet was charged with 30 g. of activated Zn dust, 3 g. of anhydrous $ZnBr_2$, and 50 ml. of anhydrous dioxane. This mixture was stirred and warmed to 80° C. in an atmosphere of nitrogen and then 23.3 g. (0.1 mole) of 1-(chlorodifluoromethyl) - 1-chlorotetrafluorocyclopropane in 20 ml. of anhydrous dioxane was added dropwise over a 3-hour period. Heating at 80° C. was continued an additional 4 hours after the addition was completed. The collected trap material was distilled to afford 7.2 g. (44%) of product, b.p. 4–6° C., which was identified as a mixture of 85% perfluoromethylenecyclopropane, 3, IR (gas) 5.50μ (C=C); NMR (neat, $CFCl_3$ ref) φ 57.3 (p,2,J=6.6 Hz.), 135.2 (t,4,J=6.6 Hz.); and 15% 1-trifluoromethyl-2,3,3-trifluorocyclopropane, 4, IR (gas) 5.29μ (C=C); NMR (neat, $CFCl_3$ ref.) φ 60.3 (d of t,3,J=7 Hz., 3 Hz.), 100.0 (d of q,2,J=36 Hz., 3 Hz.), 116.7 (t of q,1,J=36 Hz., 7 Hz.).

The Zn dust used in this example was activated by washing it with 10% hydrochloric acid followed by consecutive washings with water, ethanol, acetone and ether. It was blown dry in a nitrogen atmosphere and finally dried at 80° C. under reduced pressure for 30 minutes.

EXAMPLE 4

A slurry of 30 g. of Zn dust in 100 ml. of anhydrous dioxane in a 500 ml. flask fitted with a water condenser, a —100° C. trap attached to the condenser outlet, and a dropping funnel was warmed to 90° C. in a nitrogen atmosphere. A solution of 23.3 g. (0.1 mole) of 1-(chlorodifluoromethyl)-1-chlorotetrafluorocyclopropane in 25 ml. of dry dioxane was added dropwise to this well-stirred slurry until about half of the solution was added. The addition was discontinued until after a vigorous effervescent reaction had subsided (30 minutes). The remainder of 2 was added rapidly in one portion and a reaction temperature of 90° C. was maintained for an additional 3 hours. The collected material in the trap was fractionated to give 9.3 g. (57%) of a mixture of 90% 3 and 10% 4, b.p. 6–7° C.

EXAMPLE 5

The procedure of Example 3 was repeated except that the 1 - (chlorodifluoromethyl) - 1 - chlorotetrafluorocyclopropane solution was added over a 5-hour period, and the reaction was continued at 80–85° C. for 60 hours after addition had been completed. A 30% yield of product was obtained which consisted of 79% of 3 and 21% of 4.

EXAMPLE 6

The procedure of Example 4 was repeated. An 80% yield of product was obtained which consisted of 96% of 3 and 4% of 4.

EXAMPLE 7

The general procedure of Example 3 was followed except that the dioxane solvent was replaced with di-$n$-butyl ether. The 1-(chlorodifluoromethyl)-1-chlorotetrafluorocyclopropane solution was added over a 6-hour period, 3 hours at 80–85° C. and the last 3 hours at a reaction temperature of 100° C. Heating was continued for an additional 60 hours at 140° C. after the addition was completed. A 10% yield of product was obtained which consisted of 76.5% 3 and 23.5% 4.

EXAMPLE 8

The general procedure of Example 4 was followed except that Zn/Hg amalgam was employed in place of Zn dust. After addition of ca. half of the 1-(chlorodifluoromethyl) - 1 - chlorotetrafluorocyclopropane solution, at 90° C. (total time, 1.75 hrs.), a small amount of product was collected. The remainder of the 1-(chlorodifluoromethyl)-1-chlorotetrafluorocyclopropane was added rapidly and the reaction mixture was heated at 100° C. for 22 hours. A 37% yield of crude perfluoromethylenecyclopropane was obtained.

The Zn/Hg amalgam was prepared by washing 120 g. of 30 mesh granular Zn with 500 ml. of 5% aqueous hydrochloric acid containing 1 g. of mercuric chloride until the surface was bright. The amalgam was filtered and washed successively with 500 ml. of distilled water, 500 ml. anhydrous ethanol, 500 ml. of acetone, 500 ml. of ether, and finally it was dried in a stream of nitrogen.

EXAMPLE 9

1-(Trifluoromethyl)-2,3,3-trifluorocyclopropene

A solution of 23.3 g. (0.1 mole) of 1-(chlorodifluoromethyl)-1-chloroetetrafluorocyclopropane in 20 ml. of dry 1,2-dimethoxyethane was added dropwise (4 hrs.) to a well-stirred slurry of 30 g. of Zn dust and 4.0 g. of ZnBr$_2$ in 50 ml. of dry 1,2-dimethoxyethane at 80° C. in an atmosphere of nitrogen. The volatile product was collected in a —100° C. trap The reaction mixture was stirred an additional 5 hours at 80° C. after the addition was completed. A total of 1.5 g. (9% yield) of pure 4, B.P. 7° C., was obtained.

EXAMPLE 10

Isomerization of perfluoromethylenecyclopropane to 1-(trifluoromethyl)-2,3,3-trifluorocyclopropene A sealed tube was charged with 2.5 g. of 3, 0.5 g. of anhydrous ZnBr$_2$ and 1 ml. of dry bis(2-methoxyethyl) ether and then heated at 100° C. for 7 hours. The volatile product (2.2 g.) was identified by NMR as pure 4.

EXAMPLE 11

Homopolymer of prefluoromethylenecyclopropane

A sealed tube containing an 85:15 mixture of perfluoromethylenecyclopropane and 1-(trifluoromethyl)-2,3,3-trifluorocyclopropene and a catalytic amount of perfluoropropionyl peroxide (3P) in trichlorotrifluoroethane (Freon® 113) solvent was allowed to stand at 25° C. for 60 hours. The tube was filled with a plug of the homopolymer of perfluoromethylenecyclopropane, M.P. 250–252° C. (vaporizes).

EXAMPLE 12

A 4-mm. (id) x 20 cm. tube was charged with 1 g. of a 90:10 mixture of 3 and 4 and 0.1 ml. of a solution of 3P in trichlorotrifluoroethane (0.1 g./ml.) and the tube was allowed to stand at 25° C. for 16 hours. The tube was opened and a small amount of 4 was volatized (IR 5.29$\mu$). The remaining solid polymer was dried in vacuo at 60° C. to afford ca. 0.8 g. of powdery white solid homopolymer of perfluoromethylenecyclopropane, IR (mull) 5.82$\mu$ (C=C).

*Anal.*: Calcd. for (C$_4$F$_6$)$_n$: C, 29.65; F, 70.35. Found: C, 29.70; F, 70.14.

*TGA*: 5% wt. loss at 244° C.; 50% wt. loss at 340° C.

*DTA*: Tg: —78 to —75° C. region; melt endotherm onset at 249° C., peaked at 272° C.; solidification exotherm (cooling) at 245° C. (peak, 231° C.); shallow endothermic degradation at 358° C.

The homopolymer is insoluble in all common organic solvents, including CHCl$_3$, CH$_2$Cl$_2$, diethyl ether, acetone, perfluorodimethylcyclobutane, hexafluoroisopropanol, benzene, ethanol, dimethylformamide, dimethylsulfoxide and acetonitrile. The homopolymer has a refractive index equivalent to tetrafluoro-1,3-dithietane.

EXAMPLE 13

Homopolymer of perfluoromethylenecyclopropane was prepared from a 74:26 mixture of 3 and 4 as described in Example 12. Optically clear, and brittle films were pressed at 200° C.

EXAMPLE 14

Copolymerization of perfluoromethylenecyclopropane (A) *With tetrafluoroethylene (TFE)*.—A small glass tube was charged with 1.76 g. (10.2 mmoles) of perfluoromethylenecyclopropane (90%), 1.02 g. (10.2 mmoles) of TFE and 0.2 ml. of the 3P initiator solution used in Example 12, and the tube was allowed to stand at 25° C. overnight. After the volatiles were removed *in vacuo*, granular white solid copolymer remained, IR (mull) 5.81$\mu$ (CF$_2$=C). The copolymer showed an irreversible transition endotherm starting at 42° C. by differential scanning calorimetry (DSC). Differential thermal analysis (DTA) showed a shallow endotherm region, 175–300° C., and inverted crests at 230 and 280° C.

EXAMPLE 15

Table I summarizes the results obtained by copolymerization of perfluoromethylenecyclopropane with varying molar amounts of TFE. The polymerizations were carried out using the procedure described in Example 14; 0.1 ml. of the 3P initiator solution was employed.

TABLE I

Summary of perfluoromethylenecyclopropane (PMCP)/TFE copolymerizations

| Example | TFE, g. (mmoles) | | PMCP, g. (mmoles) | | Polymer (g.) | M.P. (° C.) | Thermal gravimetric analysis (TGA), ° C. | |
|---|---|---|---|---|---|---|---|---|
| | | | | | | | 5% wt. loss | 50% wt. loss |
| 15A | 1.5 | (15) | 0.83 | (5.1) | a 1.12 | 267 | 470 | 542 |
| 15B | 2.5 | (25) | 0.83 | (5.1) | 1.79 | 288 | 494 | 571 |
| 15C | 5.0 | (50) | 0.83 | (5.1) | 2.05 | b 297, 320 | 500 | 579 |
| 15D | 1.02 | c (10.2) | | | 0.94 | 326 | | | a Thin opaque brittle films were pressed from this copolymer at 180–215° C., IR, 5.82μ (C=C).
b Mixture of TFE homopolymer and copolymer.
c TFE homopolymerization.

EXAMPLE 16

(B) *With acrylonitrile.*—A small glass tube was charged with 0.27 g. (5.1 mmoles of acrylonitrile, 0.83 g. (5.1 mmoles) of perfluoromethylenecyclopropane (90%), and 0.1 ml. of the 3P initiator solution of Example 12, and the tube was heated to 40° C. Polymerization occurred immediately and ca. 0.3 g. of cream colored, solid copolymer was recovered. The copolymer was soluble in dimethylformamide and thin films could be pressed at 180° C., IR 4.44, μ (s, CN); 5.76 (w), 5.93 (w), 6.15 (w) (C=C).

*Anal.:* Found: C, 64.23; 64.22; H, 5.28; 5.18; N, 24.42; 24.64; F, 4.53; 4.60.

*DSC:* Irreversible endo transition at 55° C.

*DTA:* Exotherm onset at 300° C., peaked at 330° C.

Based on F, N, and H analyses, the copolymer contains approximately 40.5 moles of acrylonitrile per mole of PMCP.

EXAMPLE 17

(C) *With perfluoro(2-methylene - 4 - methyl - 1,3 - dioxolane) (PMD).*—A small glass tube was charged with 1.24 g. (5.1 mmoles) of PMD, 0.83 g. (5.1 mmoles) of perfluoromethylenecyclopropane (90%) and 0.1 ml. of 3P initiator solution, and the tube was warmed to 40–45° C. Polymer was formed immediately. A total of 1.0 g. of white powdery solid copolymer was obtained after removal of the unreacted monomers. The copolymer was soluble in perfluorodimethylcyclobutane, and clear films were cast from this solvent, IR 5.69 (w), 5.82 (w) (C=C).

*Anal.:* C, 25.09; 24.44; F, 62.62; 62.90.

*DSC:* No transition, −100 to 50° C.

*DTA:* Endothermic crests at 126, 154, 212 and 445° C.

EXAMPLE 18

(D) *With styrene.*—A small glass tube was charged with 0.53 g. (5.1 mmoles) of styrene, 0.83 g. (5.1 mmoles) of perfluoromethylenecyclopropane (90%) and 0.1 ml. of 3P initiator solution, and the tube was heated overnight at 100° C. The heterogeneous mixture which contained suspended tan solid was concentrated *in vacuo* to afford ca. 0.35 g. of tan solid copolymer, partial melting at 60–80° C.

*Anal.:* F, 11.90.

Analysis indicates approximately 7.6 moles of styrene per mole of PMCP in the copolymer.

EXAMPLE 19

(E) *With vinyl fluoride.*—A thick-walled glass tube containing 0.1 ml. of 3P initiator solution, 0.81 g. (5 mmoles) of perfluoromethylenecyclopropane (90%), and 0.55 g. (12 mmoles) of vinyl fluoride was allowed to stand 24 hours at room temperature. A heterogeneous mixture with a viscous lower layer was formed. The volatiles were evaporated and the residual material was dried in vacuo at 50° C. for 48 hours to afford 0.726 g. of brittle white solid copolymer. The copolymer was soluble in acetone and clear films cast from this solvent displayed infrared absorption bands characteristic of difluoromethylene groups, 5.86μ (s, C=CF$_2$), 5.77μ (s, C=C).

*Anal.:* Found: C, 36.24; H, 2.50; F, 59.38.

The analysis indicates approximately 2.2 moles of vinyl fluoride per mole of PMCP in the copolymer.

EXAMPLE 20

A glass tube containing 0.1 ml. of 3P initiator solution, 0.81 g. (5 mmoles) of perfluoromethylenecyclopropane (90%), and 0.28 g. (6 mmoles) of vinyl fluoride was heated at 50° C. for 20 hours. The volatiles were evaporated and the residual copolymer dried at 70° C. *in vacuo* for 16 hours to leave 0.575 g. of white solid copolymer, soluble in acetone, IR (cast film) 5.86μ (s, C=CF$_2$), 5.76μ (s, C=C). Brittle, optically clear films were pressed at 100° C. (1000 p.s.i.), IR (film) 5.74, 5.79μ (C=C). The copolymer decomposed at 100° C.

*Anal.:* Found: C, 36.86, 36.57; N, 2.37, 2.18; F, 60.30, 60.47.

The analysis indicates approximately 1.84 moles of vinyl fluoride per mole of PMCP in the copolymer.

EXAMPLE 21

(F) *With vinylidene fluoride.*—A glass tube containing a mixture of 0.72 g. (11.2 mmoles) of vinylidene fluoride, 0.81 g. (5 mmoles) of perfluoromethylenecyclopropane (90%), and 0.1 ml. of 3P initiator solution was allowed to stand 24 hours at 25° C. Volatiles were evaporated and the solid dried at 50° C. for 48 hours to give 0.844 g. of brittle white solid copolymer, soluble in acetone, IR (cast film) 5.82μ (s, C=CF$_2$).

*Anal.:* Found: C, 33.27; H, 2.14; F, 65.10.

The analysis indicates approximately 2.2 moles of vinylidene fluoride per mole of PMCP in the copolymer.

EXAMPLE 22

A glass tube containing a mixture of 0.36 g. (5.6 mmoles) of vinylidene fluoride, 0.81 g. (5 mmoles) of perfluoromethylenecyclopropane and 0.1 ml. of 3P initiator solution was heated at 50° C. for 20 hours. The volatiles were evaporated and the residue was dried at 70° C. for 16 hours to give 0.825 g. of brittle solid copolymer, soluble in acetone, IR (cast film) 5.80μ (s, C=CF$_2$). Optically clear brittle films could be pressed at 100° C. (1000 p.s.i.), IR (film) 5.56μ (w), 5.67μ (s), 5.81μ (s). Some decomposition of the copolymer occurred at 100° C.

*Anal.:* Found: C, 32.64; H, 1.49; F, 65.11.

The analysis indicates approximately 2.3 moles of vinylidene fluoride per mole of PMCP in the copolymer.

EXAMPLE 23

(G) *With chlorotrifluoroethylene.*—A mixture of 1.32 g. (11.4 mmoles) of chlorotrifluoroethylene, 0.81 g. (5 mmoles) of perfluoromethylenecyclopropane (90%), and 0.1 ml. of 3P initiator solution was allowed to stand 24 hours at 25° C. The volatiles were evaporated and the residue was dried at 50° C. for 48 hours *in vacuo* to give 0.33 g. of powdery solid copolymer, IR (Nujol mull) 5.84μ (s, C=CF$_2$).

*Anal.:* Found: C, 21.14; F, 50.83; Cl, 28.46.

The analysis indicates approximately 17.5 moles of chlorotrifluoroethylene per mole of PMCP in the copolymer.

EXAMPLE 24

Terpolymerization of perfluoromethylenecyclopropane

A 400-ml. reactor was charged with 5 g. (0.031 mole) of perfluoromethylenecyclopropane (90%), 45 g. (0.7 mole) of vinylidene fluoride, 50 g. (0.3 mole) of perfluoromethylvinyl ether, 2 ml. of 3P initiator solution and 180 ml. of trichlorotrifluoroethane, and the reactor was allowed to stand 4 hours at 25° C. The volatiles were removed at reduced pressure and the residue dried overnight at 70° C. *in vacuo* to give 7.5 g. of white solid terpolymer, insoluble in trichlorotrifluoroethane, IR 5.82μ (s, C=CF$_2$).

A mixture of 2 g. of the terpolymer, 0.04 g. of

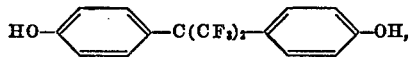

0.1 g. of MgO, and 0.04 g. of benzyltriphenylphosphonium chloride was cured rapidly in a Shawburg Curometer at 160° C.

EXAMPLE 25

A 400-ml. reactor was charged with 5 g. (0.031 mole) of perfluoromethylenecyclopropane (90%), 14 g. (0.14 mole) of tetrafluoroethylene, 44 g. (0.264 mole) of perfluoromethylvinyl ether, 2.5 ml. of 3P initiator solution and 180 ml. of trichlorotrifluoroethane, and the reactor was heated at 30–35° C. for 4 hours. The volatiles were removed at reduced pressure and the residual solid dried to give 5.2 g. of white, opaque, tough, terpolymer, IR 5.82μ (s, C=CF$_2$), 5.41μ (s).

Since obvious modifications and equivalents in the invention will be evident to those skilled in the arts, I propose to be bound solely by the appended claim.

The embodiments of the invention in which an exclusive property or privilege is claimed are defined as follows:

1. Perfluoromethylenecyclopropane.

References Cited

UNITED STATES PATENTS 2,394,581   2/1946   Benning et al. _____ 260—648 F
2,879,309   3/1959   Drysdale _____ 260—648 F DANIEL D. HORWITZ, Primary Examiner U.S. Cl. X.R.

260—900